(12) United States Patent
Lee et al.

(10) Patent No.: US 6,896,706 B2
(45) Date of Patent: May 24, 2005

(54) CARBONACEOUS MATERIALS COATED WITH A METAL OR METAL OXIDE, A PREPARATION METHOD THEREOF, AND A COMPOSITE ELECTRODE AND LITHIUM SECONDARY BATTERY COMPRISING THE SAME

(75) Inventors: Joong Kee Lee, Seoul (KR); Byung Won Cho, Seoul (KR); Won Il Cho, Seoul (KR); Joo Man Woo, Seoul (KR); Hyung Sun Kim, Seoul (KR); Un Sek Kim, Seoul (KR); Dalkeun Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 177 days.

(21) Appl. No.: 10/330,079

(22) Filed: Dec. 30, 2002

(65) Prior Publication Data

US 2003/0138698 A1 Jul. 24, 2003

(30) Foreign Application Priority Data

Jan. 17, 2002 (KR) .......................... 2002-2786

(51) Int. Cl.$^7$ ............................ H01M 6/00; H01M 4/58
(52) U.S. Cl. .................. 29/623.5; 29/623.1; 429/231.8; 429/231.95; 429/231.4; 427/123; 427/113
(58) Field of Search .................. 429/231.8, 231.95, 429/231.4; 427/123, 113; 29/623.5

(56) References Cited

U.S. PATENT DOCUMENTS 5,616,437 A 4/1997 Gao

FOREIGN PATENT DOCUMENTS

| JP | 11-329434 | 11/1999 |
| JP | 11-329435 | 11/1999 |
| JP | 3103357 | 8/2000 |
| JP | 2001-102047 | 4/2001 |
| JP | 2002-352801 | 12/2002 |
| JP | 2003-68283 | 3/2003 |

OTHER PUBLICATIONS

K.Nishimura et al., Design and performance of 10 Wh rechargeable lithium batteries, 1997, J of Power Sources, 68, pp. 436–439.*

"Design and Performance of 10 Wh Rechargeable Lithium Batteries" K. Nishimura, et al. *J. of Power Sources* 68 (1997) pp. 436–439.

"Applied Chemistry" The Korean Society of Industrial and Engineering Chemistry, general meeting (May 1997) pp. 198–201.

"Improvement of Lithium Dope/Undope Characteristics of Graphite Treated with Sn Chloride" A. Wataka, et al. The 38th Aniversary of Battery Forum (1997) pp. 207–208.

* cited by examiner

*Primary Examiner*—Patrick Ryan
*Assistant Examiner*—Angela J. Martin
(74) *Attorney, Agent, or Firm*—McDermott Will & Emery LLP

(57) ABSTRACT

A carbon anode active material for lithium secondary battery comprising a cluster or thin film layer of a metal or metal oxide coated onto the surface of the carbon active material, a preparation method thereof, and a metal-carbon hybrid electrode and a lithium secondary battery comprising the same. The carbon active material is prepared through a gas suspension spray coating method. An electrode comprising the carbon active material according to the present invention shows excellent conductivity, high rate charge/discharge characteristics, cycle life characteristics and electrode capacity close to theoretical value.

7 Claims, 4 Drawing Sheets

CARBONACEOUS MATERIALS COATED WITH A METAL OR METAL OXIDE, A PREPARATION METHOD THEREOF, AND A COMPOSITE ELECTRODE AND LITHIUM SECONDARY BATTERY COMPRISING THE SAME

BACKGROUND OF THE INVENTION

1. Field of the Invention

The present invention relates to an anode active material comprising a carbon coated with a metal or metal oxide thereon for a lithium secondary battery, a preparation method thereof, and a composite electrode and a lithium secondary battery comprising the same.

2. Description of the Prior Art

Recently, a lithium secondary battery is made with a variety of carbon materials such as cokes, graphite, etc. However, when the graphite group is used as an anode active material, change of a carbon lattice constant is large in charging and discharging, and a carbon active material is gradually separated from an electron transmission path in repeated charge and discharge. As a result, an electrode capacity is lowered. In addition, in the conventional carbon anode, conductivity is lowered due to a solid electrolyte interface (hereinafter, referred to as "SEI") coating which is formed on the surface of the carbon active material. The "SEI coating" means a coating layer formed on the surface of the carbon active material through a reaction of lithium metal with an organic solvent when charging. The SEI coating allows passing lithium ions into the carbon structure because it has an ionic conductivity, but cuts off passage of an organic solvent. Therefore, if the SEI coating is not formed, performance of a battery is rapidly lowered because an organic solvent may penetrate into a carbon structure to cause exfoliation of the graphite structure, and accordingly, the electrode active material may separate from an ion transmission path.

However, if SEI coating is formed, electrical conductivity is low with high rate charging and discharging of a battery, because SEI coating is not electrically conductive, to result in an inhomogeneous electric potential distribution of the electrode. As a result, discharge capacity of the battery is lowered, and a cycle life of the battery is also lowered due to partial charging and discharging.

In order to complement the conductivity lowering caused by the large carbon lattice constant change of the carbon active material and the SEI coating layer formed on the surface of the carbon, it has been generally attempted to add a carbon with good conductivity, for example, acetylene black (AB) to an electrode as a conductive material. However, such solutions have not been provided yet.

In the meantime, the carbon active material may be separated from the electrode due to an organic solvent electrolyte. It may be caused by gas generation, etc. resulting from dissociation of a solvent injected into the carbon together with lithium. In order to prevent the separation of the carbon active material and improve binding strength of the active material, the amount of a binder added may be increased. However, it is also disadvantageous in that charge/discharge characteristics of the electrode are deteriorated because the amount of the electrode active material to be added is reduced and internal resistance is increased.

In a conventional secondary battery using carbon, especially graphite, as an anode active material, if an organic solvent electrolyte of a propylene carbonate (hereinafter, referred to as "PC") group is used, cycle characteristics of an electrode are very poor and capacity of the electrode is seriously lowered. Therefore, an organic solvent electrolyte of an ethylene carbonate (hereinafter, referred to as "EC") group is mainly used. However, even though the organic solvent electrolyte of the EC group is used, it shows not only electrode capacity lower than theoretical value but also continuous reduction of the electrode capacity in proceedings of cycles.

Therefore, some methods have been suggested for complementing the conductivity lowering due to the change of the carbon lattice constant and the SEI coating layer formed on the surface of the carbon active material. Examples of such research include the following: a method in which instead of a carbon conductive material such as AB, etc., a metal having a good conductivity such as silver is inserted into the carbon through a reductive treatment (J. Power Source, 68, pp.436–439 (1997); and Korean Society of Industrial and Engineering Chemistry, Spring General Meeting, Abstracts, pp.198–201 (1997)); and a method in which two or more anode active materials are used together by depositing tin oxide, etc. onto the carbon to improve electrode capacity (The 38th anniversary of Battery Forum, pp.207–208, Osaka, Japan, 1997).

In the latter method, unlike the present invention, carbon is added into a solution of tin chloride dissolved in distilled water, and the resulting solution is then evaporated at room and elevated temperatures, thereby to deposit the tin contained in the solution. Therefore, the deposited tin is also used as an electrode active material. In this case, although electrode capacity may be improved, high rate charge/discharge characteristics and cycle characteristics are not improved. In addition, it is disadvantageous in that an initial irreversible capacity is very high because a large amount of tin oxide is included and used as an electrode active material, and a battery capacity is lowered as a whole when $LiCoO_2$, $LiMn_2O_4$ or the like is used as a cathode. In order to solve such problems, lithium may have to be inserted into an anode in advance by using an external resistance or external power. However, it makes a battery fabrication process complicate. It is further disadvantageous in that a capacity is continuously lowered because irreversible $Li_{22}Sn_5$ is produced in progress of charge/discharge.

In the mean time, the method of depositing a metal such as silver, etc. onto a carbon is for improving the conductivity of carbon electrode. That is, because silver having a good conductivity is added, a conductivity of the electrode may be improved. However, because it can not prevent the electrode capacity lowering caused by the dissociation of an organic solvent electrolyte injected together with lithium, there is a limitation on selection of an organic solvent electrolyte.

Another disadvantage of the conventional preparation method of a carbon electrode is that there are problems relating to a electrode plasticity. The most serious problem is that when an electrode is prepared by casting an electrode active material onto a metal thin plate used as a current collector, the carbon active material is separated from the collector because of weak binding strength between the collector and the active material. If a binder is added in order to solve this problem, an internal resistance of the electrode is increased, and accordingly high rate charge/discharge characteristics and cycle characteristics of the electrode are lowered. In order to enhance the binding strength between the carbon active material and the metal collector, a method for forming a metal oxide layer onto the metallic current collector is disclosed in the U.S. Pat. No. 5,616,437. In this method, the metal oxide layer is formed between the metallic current collector and carbon to enhance binding strength and conductivity between the collector and the carbon. However, this method could not solve all the problems of the conventional carbon active material.

Accordingly, it is necessary to solve all the problems in the conventional art including electrode capacity lowering caused by separation of an active material resulting from a large change of the carbon lattice constant or formation of SEI coating layer on the surface of the carbon active material, difficulties in high rate charge/discharge, and electrode capacity lowering caused by solvent dissociation reaction resulting from co-injection of an organic solvent, etc.

SUMMARY OF THE INVENTION

Therefore, an object of the present invention is to provide a carbon anode active material for a lithium secondary battery, comprising a cluster or a thin film of metal or metal oxide formed onto the surface of carbon particles.

Another object of the present invention is to provide a preparation method of the above carbon anode active material.

Still another object of the present invention is to provide a metal-carbon hybrid electrode and a lithium secondary battery comprising the above carbon anode active material.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1A:
FIG. 1a is a SEM photograph of the surface of a surface-unmodified carbon material for an electrode.

The carbon anode active material according to the present invention comprises a cluster or a thin film of a metal or metal oxide formed onto the surface of carbon particles. Generally, the cluster or thin film has a thickness of 1–300 nm.

Carbon particles in the carbon anode active material may be graphite, cokes or hard carbon. The metal or metal oxide constituting the thin film or cluster are selected from the group consisting of Li, Al, Sn, Bi, Si, Sb, Ni, Cu, Ti, V, Cr, Mn, Fe, Co, Ag, and alloys and oxides thereof.

In an organic solvent electrolyte injected into a battery, the carbon anode active material according to the present invention forms a stable coating layer which exhibits good conductivity and has a different composition from the coating formed onto the surface of a pure carbon material. The coating layer of the present invention allows passing lithium ions into the electrode structure only and cuts off penetration of a solvent. Therefore, an organic solvent dissociation reaction does not take place any more after a first cycle, and it makes cycle characteristics be better, and accordingly, capacity lowering of the electrode in charge/discharge can be remarkably reduced. The metal oxide in the cluster or thin film on the surface of carbon exists as a metal after it forms a coating layer having a different composition from that of the conventional coating layer onto the surface of the electrode. Therefore, it can prevent electrode conductivity lowering caused by a large change of the carbon lattice constant occurred when lithium is inserted into the carbon structure. It can also render electrical conductivity by preventing the formation of SEI coating onto the surface of the carbon active material. As a result, conductivity of the electrode can be improved.

In addition, capacity of electrode active material can be more close to a theoretical capacity value because it reduces a formation of SEI coating that is a cause of irreversible capacity. In particular, the carbon anode active material of the present invention is stable in an organic solvent electrolyte of a PC group which is difficult to be used in the conventional art due to decrease of electrode cycle characteristics and increase of initial irreversible capacity, in spite of lots of good properties. Therefore, the electrode comprising the active material of the present invention is superior in electrode capacity and cycle characteristics.

In the carbon anode active material of the present invention, the metal or metal oxide layer on the surface of carbon does not function as an anode active material. It functions for improving interfacial characteristics of an electrolyte of the electrode by forming a new interfacial film between the electrode and electrolyte, and its main function is to increase the conductivity by the metal still present after forming the interfacial film.

The carbon anode active material comprising a metal or metal oxide layer on the surface of carbon particles at a thickness of 1–300 nm of the present invention make it possible to broaden the selection of an organic solvent electrolyte for lithium secondary battery, improve binding strength of the active material without adding a binder and prevent separation of carbon active material from an electron transmission path. Therefore, it is possible to fabricate a battery exhibiting excellent charge/discharge characteristics and cycle life characteristics according to the present invention.

The present invention also relates to a preparation method of the above carbon anode active material comprising a cluster or a thin film layer of a metal or metal oxide on the surface of particles of graphite, cokes or a hard carbon.

The anode active material of the present invention can by prepared by gas suspension spray coating. In more detail, the preparation method of the anode active material of the present invention comprises the following steps of:

(a) making particles of carbon active material float in a gas;

(b) spraying solution of a metal salt onto the floating particles;

(c) drying the resulting particles, thereby to coat the metal salt onto the surface of the particles; and (d) heating the dried particles under various conditions, thereby to form a cluster or a thin film of metal or metal oxide onto the surface of the particles at a thickness of 1–300 nm.

Herein, "making particles float" has the same meaning as "making particles to be in a suspended state".

Hereinafter, the preparation method of the anode active material of the present invention comprising gas suspension spray coating will be described in more detail.

Carbon particles are floated in a gas so as to make into a layer in a thermostatic coating chamber maintained at a temperature below 100° C. Air, hydrogen gas, or an inert gas such as nitrogen or argon gas can be used as a gas for floating carbon particles.

After floating the carbon particles in the gas, temperature of the thermostatic coating chamber is adjusted to be in the range required for coating a metal salt, that is, 30–95° C. A solution of a metal salt is dispersed into the floated carbon layer in the thermostatic coating chamber through a nozzle which is connected to a gas distribution plate located below the floated carbon layer. Through this, the solution of the metal salt is uniformly coated onto the surface of the carbon particles while viscosity of the metal salt solution is changed. The metal salt is then dried and solidified, thereby to stick to the surface of the carbon particles.

Pressure control inside the thermostatic coating chamber is closely related to properties of pores in the carbon material. Generally, when intended to deposit a metal or metal oxide inside the pores, the pressure is maintained at a low pressure, less than 50 torr. When intended to deposit a metal or metal oxide onto the surface of carbon only, the pressure is maintained at a relatively high pressure around 760 torr, close to the atmospheric pressure. Because the present invention is intended to coat a metal or metal oxide onto the surface of carbon particles, the pressure of a chamber is adjusted to be the latter one, that is, around 760 torr.

The shape and characteristics of the film coated onto the surface of the particles are changed in parallel with varying the viscosity of the solution depending on concentration, composition and kind of a solution of a metal salt to be coated. Therefore, a database build-up about relations between properties of the solution and shapes of film coated is required. Drying speed and wetting ability of a solution wetting the carbon material inside a suspension spray coating chamber at a constant temperature depend on the solvent used for dissolving a metal salt. Therefore, solvent selection is important in order to make an appropriate coating layer be formed. It is preferable that solution of metal salts used as coating solution has a concentration in the range of 0.5–20 wt %. In addition, when intended to form a multi-component coating layer, it is possible that several kinds of metal salt are simultaneously dissolved in a solvent and the resulting solution is used as a coating solution. Therefore, the composition of the coating solution can be varied depending on the desired composition of the coating layer. By coating the solution of a metal salt onto the carbon material for 3–5 hours under the above-mentioned conditions, the carbon material coated with a metal salt is obtained.

The carbon particles coated with a metal salt are then heated under a gas, for example, nitrogen, hydrogen, air or argon, atmosphere at the temperature of 200–800° C., thereby to remove salt elements from the coated metal salt. It is to use the property by which the salt elements in most of the metal salts are devolatilized and then calcinated by or reacted with the atmospheric gas at the temperature of 300–500° C.

The temperature and atmospheric gas for the heating process have a close relationship with composition, shape and surface coverage of a metal or metal oxide coating layer to be formed. Metal element produced from the calcination of the metal salt remains as a metal or metal oxide on the surface of the carbon particles depending on reductive or oxidative atmosphere. The metal or metal oxide is formed into a cluster or a thin film on the surface of the carbon particles depending on the degree of the surface coverage of a metal salt which is present on the surface of the carbon particles before the heating process. When using a solution containing two or more metal salts as a coating solution, it is possible to produce a composite metal or metal oxide thin film onto the surface of the carbon material.

The metal salt coated onto the surface of the carbon material is selected from the group consisting of nitrates and chlorides of Li, Al, Sn, Bi, Si, Sb, Ni, Cu, Ti, V, Cr, Mn, Fe, Co, Ag, $CH_3CO_2Li$, $(CH_3)_3Al$, $(C_2H_5)_3Al$, $(C_4H_9)_3Al$, $(CH_3)_3Bi$, $(C_2H_5)_3Sb$, $(C_3H_7)_3Sb$, $CF_3CO_2Ag$, $CH_3CO_2Ag$, $(C_2H_5O)_4Si$, $(C_2H_5)_3SiH$, $(CH_3)_4Sn$, $(C_2H_5)_4Sn$, $Cu(hfac)_2$, Cu(acac), Cu(DPM), (hfac)Cu(I)MP and (Hfac)Cu(I)(DMB). In the present invention, the above metal salt is dissolved in water, an alcohol, a mixture of water and an alcohol, a mixture of water and acetone or a mixture of water, an alcohol and acetone, and the resulting solution is used as a coating solution.

The gas suspension spray coating apparatus used for the present invention comprises:

(1) a nozzle unit for atomizing the metal salt which is a coating precursor;

(2) a gas distributor plate for floating carbon particles in the gas by forming gas bubbles in the lower part, thereby to get uniform coating effect; and (3) an assembly having a filter for filtering and capturing the elutriated particles to make the captured carbon particles float again by vibrating.

The apparatus further comprises a thermostat for maintaining the temperature of the chamber at a drying temperature of the precursor, a filter made of teflon for recapturing elutriated carbon particles, and an induction draft fan, a pressure controller and a pressure sensor which can control the reaction pressure below the atmospheric pressure, etc.

The thermostatic coating chamber has specially designed partitions for preventing aggregation of carbon particles and improving mixing effect between particles present in the axial direction. Therefore, carbon particles are actively circulated inside the thermostatic coating chamber. In order words, the gas suspension spray coating apparatus for performing the method of the present invention essentially comprises a gas distributor plate for suspension, a metal salt supply system, elutriated material capturing system, and a system for treating a waste gas containing nitrates or chlorides.

When using the above-described apparatus, it is possible to coat various metal or metal oxide onto an electrode material as a thin film or a cluster, and can freely control surface coverage, thickness of the thin film and the like. In addition, surface of carbon active material can be modified by sequentially or simultaneously coating several kinds of metals or metal oxides, as well as one kind of metal or metal oxide, onto the electrode material.

Accordingly, the preparation method of the present invention is characterized in that surface of the carbon electrode material for a lithium secondary battery can be modified through one step process in which a technique for maintaining particles as a floating state is combined with a nozzle for spraying a solution of a metal salt.

Another important technical feature of the present invention is that since the process is simple, the operation of the apparatus is simple, and it is possible to input various reaction conditions to the chamber. Therefore, an optimum condition exhibiting good surface modification effect for various carbon materials can be easily found. It is also advantageous in that even though the reactor is scaled-up, there is no change in heat and material transmission characteristics in the gas suspension coating chamber, and accordingly there is no limitation on setting the capacity of the surface treatment of the carbon material.

A carbon electrode is prepared by using the carbon particles prepared as described above as an electrode active material in an amount of 90–95 wt % of the total weight of the electrode and using polyvinylidenefluoride (hereinafter, referred to as "PVDF") as a binder.

A lithium secondary battery can be fabricated by using the carbon electrode prepared as described above and a cathode selected from the group consisting of $LiCoO_2$, $LiMn_2O_4$, $LiNiO_2$, $V_2O_5$ and $V_6O_{13}$.

EXAMPLES

The present invention will be described in more detail by way of the following examples, to which are not intended to limit the scope of the present invention.

Example 1 illustrates a preparation of a carbon active material in which a cluster or thin film layer of a single or composite metal such as copper, nickel, silver and the like is formed onto the surface of carbon material at a thickness of 1–300 nm. Examples 2 to 4 illustrate preparations of carbon anodes in which copper-, nickel- and silver-coated carbon materials prepared in Example 1 are respectively used as an anode active material, and lithium secondary batteries comprising the respective anode. Comparative example illustrates preparation of a conventional anode comprising a surface-unmodified carbon active material. In Examples, Comparative Example, FIGS. 3 and 4 and Tables 3 and 4, the C ratio shown as C/5, C/3 and C/2 means a reciprocal of the time required for 100% charge or 100% discharge of an electrode capacity.

Example 1

A carbon electrode material of 10–100 μm in size dried in an oven at 100° C. for two hours was put into a thermostatic coating chamber, equipped with a porous distributor plate and a nozzle in the lower part while the temperature of the thermostatic coating chamber was maintained below 100° C. The carbon electrode material was then floated by blowing air, or an inert gas such as nitrogen or argon. The temperature of the thermostatic coating chamber was then adjusted to be in the range of 30–95° C. Herein, air was generally used. However, an inert gas was used when a coating solution was subjected to ignition, or a reaction process was performed at a temperature above 80° C. because metal salt was not dried quickly enough in the thermostatic coating chamber.

A solution in which copper nitrate, nickel nitrate or silver nitrate was dissolved in aqueous methanol or ethanol containing 0.5–50% of methanol or ethanol was used as a solution of metal salt for depositing a tin film or a cluster of copper, nickel or silver onto the surface of the carbon material. The pressure for spraying the coating solution was maintained at 3 kg/cm². The concentration of the solution of a metal salt was 0.5–20 wt %, and coating time was generally maintained in 3–5 hours. Generally, surface coverage of the coated sample was in proportion to the spray rate of the coating solution, temperature of the thermostatic coating chamber and coating time.

When the coating was finished in the thermostatic coating chamber, a dried carbon material coated with a metal salt was obtained. The obtained material was put into a sintering apparatus and heated at 200–800° C. under a gas atmosphere such as nitrogen, hydrogen, air or argon. The temperature and gas atmospheres of the heating process were closely related to composition, shape and surface coverage of the metal film to be obtained.

The following tables 1 and 2 respectively show detailed experimental conditions for coating a single metal or composite metal film.

TABLE 1

| Coating Film (Content, wt %) | Solute | Composition of Coating Solution Solute:Distilled water:Ethanol or Methanol (wt %) | Injection rate of Coating Solution | Flow Rate of 2nd Gas (1/min) | Process Temp. (° C.) | Nozzle Pressure (MPa) | Coating Time (min.) | Heating Time (hr.) | Heating Temp. (° C.) |
|---|---|---|---|---|---|---|---|---|---|
| Ag (2.5) | $AgNO_3$ | 1:4.31:14.23 | 1.5 | 22 | 38.3 | 0.027 | 293 | 5 | 450 |
| Cu (2.5) | $Cu(NO_3)_2$ | 1:2.05:8.11 | 1.5 | 25 | 39.5 | 0.025 | 320 | 5 | 300 |
| Sn (2.5) | $SnCl_2$ | 1:3.75:12.84 | 1.5 | 18 | 36.4 | 0.024 | 267 | 5 | 500 |
| Ni (2.5) | $Ni(NO_3)_2$ | 1:1.26:4.66 | 1.5 | 21 | 38.0 | 0.025 | 304 | 5 | 500 |

TABLE 2

| Coating Film (Content, wt %) | Solute | Composition of Coating Solution Solute:Distilled water:Ethanol/ Methanol (wt %) | Injection rate of Coating Solution | Flow Rate Of 2nd Gas (1/min) | Process Temp. (° C.) | Nozzle Pressure (MPa) | Coating Time (min.) | Heating Time (hr.) | Heating Temp. (° C.) |
|---|---|---|---|---|---|---|---|---|---|
| Ag:Ni (1:1) | $AgNO_3$ $Ni(NO_3)_2$ | 1:4.49:18.26 | 1.5 | 24 | 38 | 0.025 | 287 | 5 | 500 |
| Ag:Cu (1:1) | $AgNO_3$ $Cu(NO_3)_2$ | 1:4.74:21.39 | 1.5 | 25 | 38 | 0.025 | 313 | 5 | 500 |

TABLE 2-continued

| Coating Film (Content, wt %) | Solute | Composition of Coating Solution Solute:Distilled water:Ethanol/Methanol (wt %) | Injection rate of Coating Solution | Flow Rate Of 2nd Gas (l/min) | Process Temp. (° C.) | Nozzle Pressure (MPa) | Coating Time (min.) | Heating Time (hr.) | Heating Temp. (° C.) |
|---|---|---|---|---|---|---|---|---|---|
| Ag:Sn (1:1) | AgNO$_3$ SnCl$_2$ | 1:7.51:39.51 | 1.5 | 21 | 39 | 0.023 | 307 | 5 | 500 |

Figure 1B:
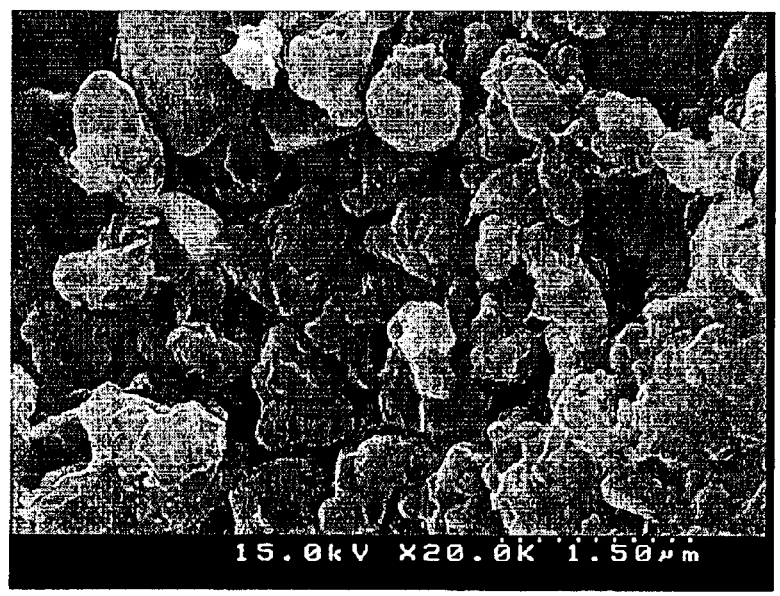
FIGS. 1b–1d are photographs respectively showing surfaces of the Cu-coated, Ni-coated and Ag-coated carbon material according to the present invention.
Figure 1C:
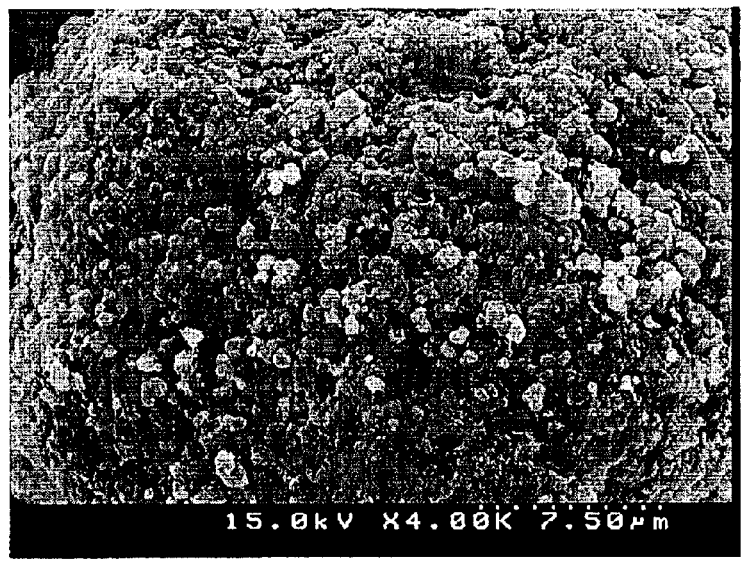
Figure 1D:
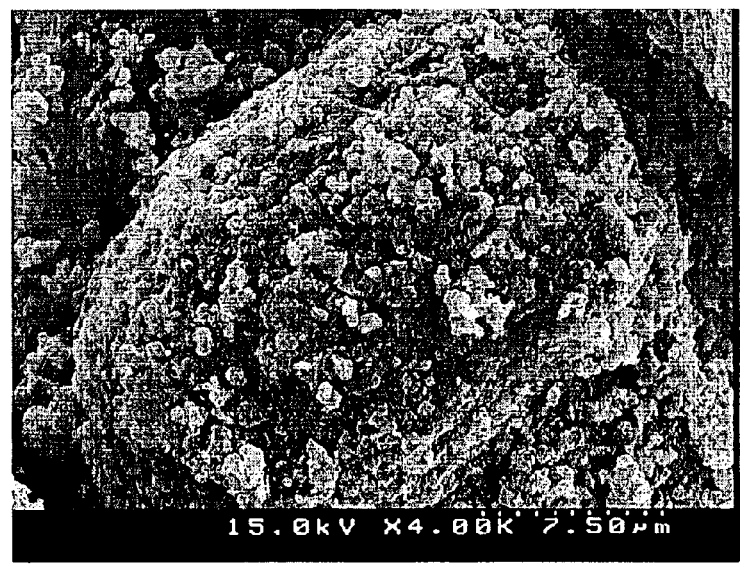

Outlet temperature of a gas heater: 80–95° C.
Suspension pressure lowering range: 35–75 mmHg FIGS. 1a–1d are photographs respectively showing the surfaces of the carbon electrode materials. FIG. 1a is a photograph showing a surface-modified carbon material, and FIGS. 1b–1d are photographs showing the surfaces of the carbon electrode materials coated with copper, nickel and silver, respectively.

Figure 2:
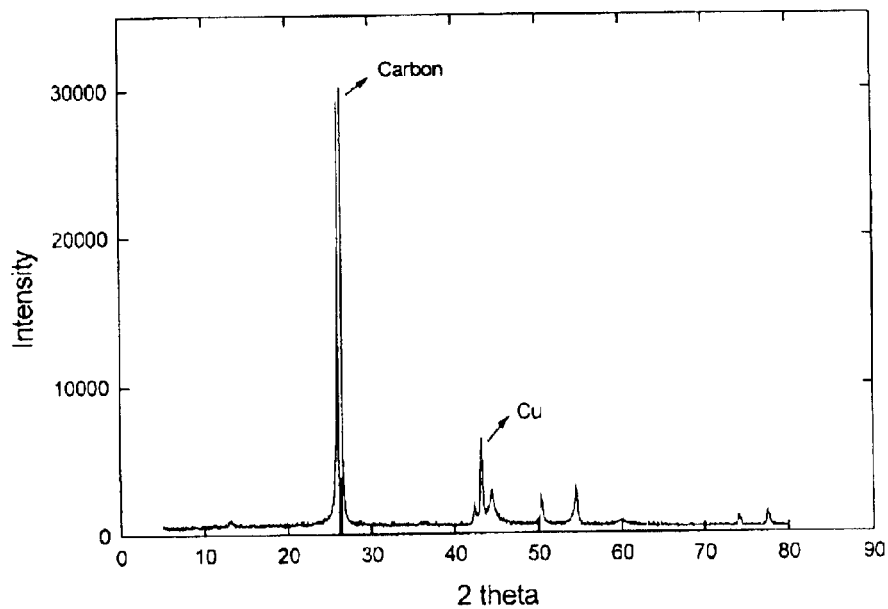
FIG. 2 shows the result of XRD analysis for the surface of the Cu-coated carbon material according to the present invention.

FIG. 2 is a graph showing the result of X-ray diffraction (hereinafter, referred to as "XRD") analysis for a surface-modified graphite powder of Mesophase Carbonaceous Micro Bead (MCMB) with copper by the gas suspension spray coating. As shown in the curve of the XRD, Cu peak was identified around 43° of 2θ. In addition, it was discovered with a Atomic absorption spectrometry that copper or copper oxide was coated in an amount of 220 ppm—10% by weight per 1 gram of carbon depending on coating conditions. Further, the coating film of a metal was qualitatively analyzed with the XRD or an ICP.

Example 2

5.7 g of copper-coated carbon prepared according to Example 1 and 0.4 g of PVdF were mixed with an appropriate amount of N-methyl-2-pyrrolidone (hereinafter, referred to as "NMP") and acetone. When the resulting mixture had an appropriate viscosity, it was cast onto a copper thin plate, dried, and rolled to obtain a carbon anode coated with copper.

5.7 g of LiCoO$_2$, 0.6 g of acetylene black (hereinafter, referred to as "AB") and 0.4 g of PVdF were mixed with an appropriate amount of NMP and acetone. When the resulting mixture had an appropriate viscosity, it was cast onto an aluminum thin plate, dried and rolled to obtain a LiCoO$_2$ cathode.

A lithium secondary battery was constructed by stacking the copper-coated carbon electrode, a PP separator film and the LiCoO$_2$ cathode. 1M LiPF$_6$ solution in ethylene carbonate/ethyl methyl carbonate was then injected into the battery. Electrode capacity and cycle life of the fabricated battery were then examined with a charge-discharge rate of C/2 based on the cathode.

Example 3

5.7 g of nickel-coated carbon prepared according to Example 1 was used for preparing a carbon anode and a lithium secondary battery comprising the same in the same manner as described in Example 2. Electrode capacity and cycle life of the fabricated battery were then examined with a charge-discharge rate of C/2 based on the cathode.

Example 4

5.7 g of silver-coated carbon prepared according to Example 1 was used for preparing a carbon anode and a lithium secondary battery comprising the same in the same manner as described in Example 2. Electrode capacity and cycle life of the fabricated battery were then examined with a charge-discharge rate of C/2 based on the cathode.

Comparative Example 5.7 g of carbon and 0.4 g of PVdF were mixed with an appropriate amount of NMP and acetone. When the resulting mixture had an appropriate viscosity, it was cast onto a copper plate, dried and rolled, thereby to obtain a carbon anode.

5.7 g of LiCoO$_2$, 0.6 g of AB and 0.4 g of PVdF were mixed with an appropriate amount of NMP and acetone. When the mixture had an appropriate viscosity, it was cast onto an aluminum plate, dried and rolled, thereby to obtain a LiCoO$_2$ cathode.

A lithium secondary battery was constructed by stacking the carbon anode, a PP separating film and the LiCoO$_2$ cathode. 1M LiPF$_6$ solution in ethylene carbonate/ethyl methyl carbonate was then injected into the lithium secondary battery. Electrode capacity and cycle life of the fabricated battery were then examined with a charge-discharge rate of C/2 based on the cathode.

Figure 3:
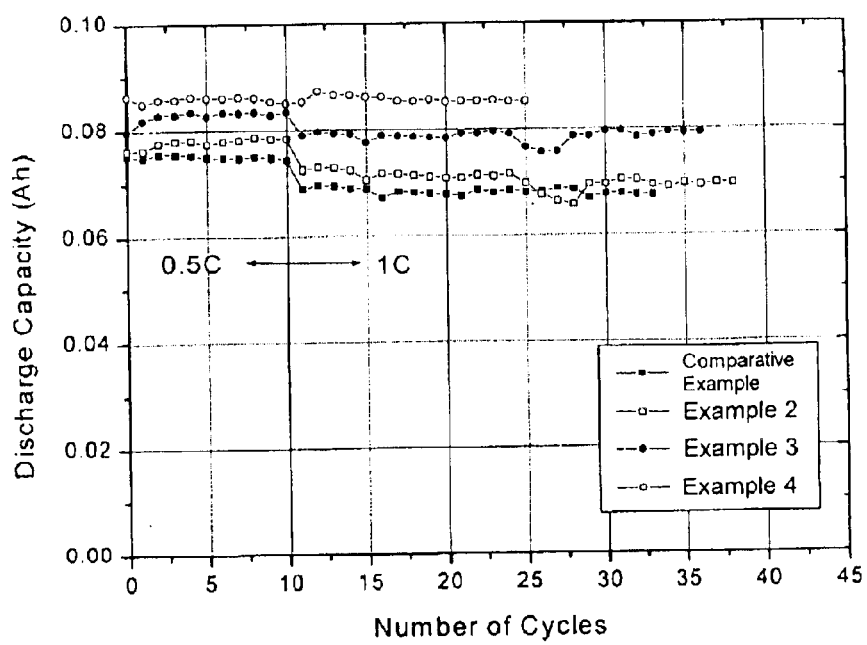
FIG. 3 shows the evaluation results of capacity and cycle performance for the anode comprising the metal-coated carbon material according to the present invention.
Figure 4A:
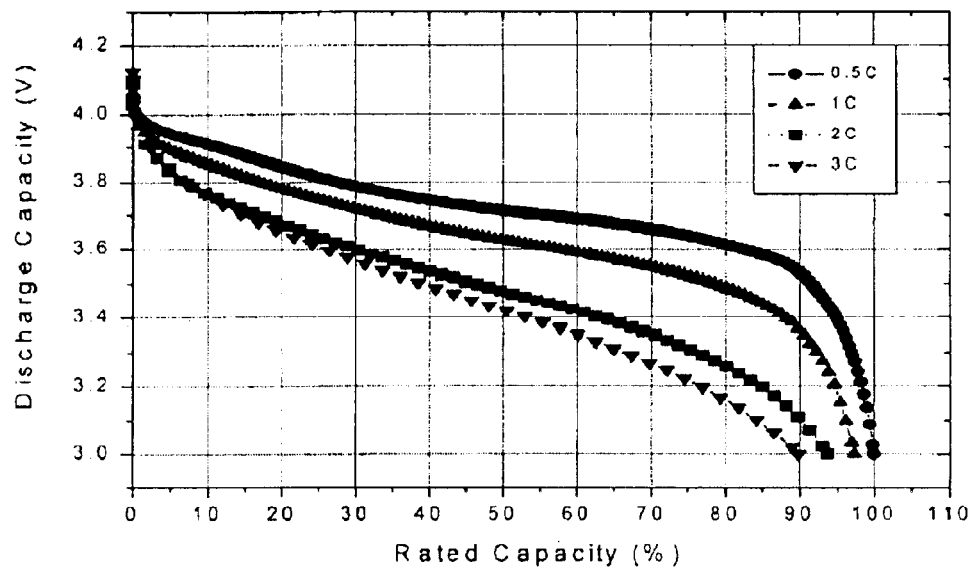
FIGS. 4a and 4b shows high-rate discharge characteristics of the anode comprising the metal-coated carbon material according to the present invention.
Figure 4B:
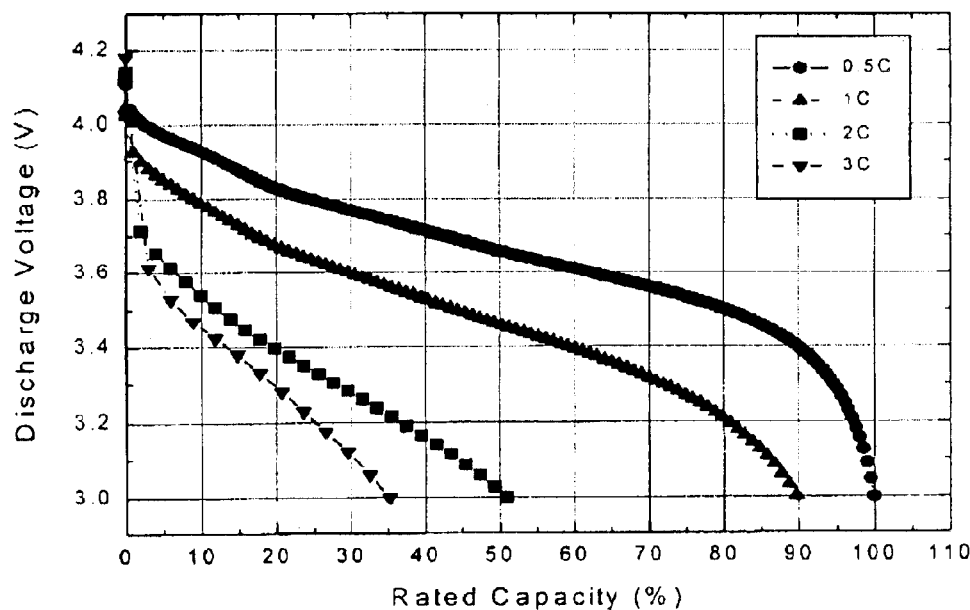

FIG. 3 shows the electrode capacities and cycle life characteristics of the lithium secondary batteries fabricated in Examples 2 to 4 of the present invention and Comparative Example, which were examined with a charge-discharge rate of C/2 based on the cathode. FIG. 4 shows high rate discharge characteristics of the lithium secondary batteries fabricated in Example 4 of the present invention and Comparative Example.

The following Tables 3 and 4 exhibit the charge/discharge capacities and initial efficiencies of the lithium secondary batteries comprising the carbon anode active material coated with a single or composite metal film according to the present invention.

TABLE 3

| Coating Material | Coating Quantity (wt %) | C/5 | | | C/3 | | | C/2 | | |
|---|---|---|---|---|---|---|---|---|---|---|
| | | Discharge Capacity (mAh/g) | Charge Capacity (mAh/g) | Initial Efficiency (%) | Discharge Capacity (mAh/g) | Charge Capacity (mAh/g) | Initial Efficiency (%) | Discharge Capacity (mAh/g) | Charge Capacity (mAh/g) | Initial Efficiency (%) |
| — | — | 285.43 | 321.43 | 89 | 272.41 | 313.84 | 87 | 251.82 | 291.795 | 86 |
| Ag | 1 | 304.82 | 341.34 | 89.3 | 298.56 | 336.98 | 88.6 | 285.64 | 323.86 | 88.2 |
| | 2.5 | 319.71 | 350.94 | 91.1 | 315.61 | 351.85 | 89.7 | 302.35 | 342.80 | 88.2 |
| Cu | 1 | 298.69 | 342.14 | 87.3 | 291.37 | 346.05 | 84.2 | 281.68 | 346.04 | 81.4 |
| | 2.5 | 311.34 | 355.82 | 87.5 | 307.05 | 360.13 | 85.4 | 304.94 | 370.52 | 82.3 |
| Ni | 1 | 291.92 | 329.11 | 88.7 | 282.34 | 327.16 | 86.3 | 276.61 | 324.66 | 85.2 |
| | 2.5 | 309.31 | 347.15 | 89.1 | 303.52 | 345.3 | 87.9 | 295.15 | 340.43 | 86.7 |
| Sn | 1 | 290.22 | 348.82 | 83.2 | 280.68 | 346.09 | 81.1 | 272.28 | 348.63 | 78.1 |
| | 2.5 | 303.83 | 359.56 | 84.5 | 295.78 | 355.93 | 83.1 | 286.34 | 356.59 | 80.3 |

TABLE 4

| Coating Material | Coating Quantity (wt %) | C/5 | | | C/3 | | | C/2 | | |
|---|---|---|---|---|---|---|---|---|---|---|
| | | Discharge Capacity (mAh/g) | Charge Capacity (mAh/g) | Initial Efficiency (%) | Discharge Capacity (mAh/g) | Charge Capacity (mAh/g) | Initial Efficiency (%) | Discharge Capacity (mAh/g) | Charge Capacity (mAh/g) | Initial Efficiency (%) |
| AgNi | 2 (1/1) | 317.28 | 352.14 | 90.1 | 312.38 | 354.17 | 88.2 | 309.24 | 352.61 | 87.7 |
| AgSn | 2 (1/1) | 305.14 | 353.58 | 86.3 | 298.17 | 354.12 | 84.2 | 285.23 | 328.27 | 81.9 |
| AgCu | 2 (1/1) | 307.28 | 352.78 | 87.1 | 299.61 | 350.01 | 85.6 | 287.12 | 349.29 | 82.2 |

It could be certainly identified in FIGS. 3–4 and Tables 3–4 that characteristics of the lithium secondary battery according to the present invention were superior to those of the battery according to Comparative Example comprising a conventional surface-unmodified carbon material.

Because the present invention makes the fabrication of a secondary battery having high performance possible, it can be applied to a variety of industrial fields such as small-sized electronic appliances, a communication equipment, power supply for an electronic automobile and the like.

As the present invention may be embodied in several forms without departing from the spirit or essential characteristics thereof, it should also be understood that the above-described Examples are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A preparation method of a carbon active material for a lithium secondary batter, which comprises a thin film or a cluster layer of a metal or metal oxide coated onto the surface of the carbon at a thickness of 1–300 nm, comprising the steps of:
   (a) floating carbon particles in a gas at a temperature below 100° C.;
   (b) coating a metal salt onto the carbon particles by spraying a solution of the metal salt to the layer of the floated carbon particles; and
   (c) heating the metal salt coated-carbon particles under a gas atmosphere selected from the group consisting of hydrogen, nitrogen and argon at a temperature of 200–800° C., thereby to obtain a metal or metal oxide-coated carbon active material.

2. The method according to claim 1, wherein the metal or metal oxide is selected from the group consisting of Li, Al, Sn, Bi, Si, Sb, Ni, Cu, Ti, V, Cr, Mn, Fe, Co, Ag, and alloys and oxides thereof.

3. The method according to claim 1, the metal salt is selected from the group consisting of nitrates and chlorides of Li, Al, Sn, Bi, Si, Sb, Ni, Cu, Ti, V, Cr, Mn, Fe, Co and Ag, $CH_3CO_2Li$, $(CH_3)_3Al$, $(C_2H_5)_3Al$, $(C_4H_9)_3Al$, $(CH_3)_3Bi$, $(C_2H_5)_3Sb$, $(C_3H_7)_3Sb$, $CF_3CO_2Ag$, $CH_3CO_2Ag$, $(C_2H_5O)_4Si$, $(C_2H_5)_3SiH$, $(CH_3)_4Sn$, $(C_2H_5)_4Sn$, $Cu(hfac)_2$, Cu(acac), Cu(DPM), (hfac)Cu(I)MP and (Hfac)Cu(I)(DMB).

4. The method according to claim 1, wherein a solvent for the solution of the metal salt is water, a mixture of water and an alcohol, a mixture of water and acetone and a mixture of water, an alcohol and acetone.

5. The method according to claim 1, wherein the carbon particle is graphite, cokes or hard carbon.

6. A carbon anode, comprising the carbon active material prepared by the method of claim 1.

7. A lithium secondary battery, comprising an anode comprising the carbon active material prepared by the method of claim 4 and a cathode selected from the group consisting of $LiCoO_2$, $LiMn_2O_4$, $LiNiO_2$, $V_2O_5$ and $V_6O_{13}$.

* * * * *